(12) United States Patent
Zhang et al.

(10) Patent No.: US 10,761,231 B2
(45) Date of Patent: Sep. 1, 2020

(54) GENERATING A HIGH-RESOLUTION LITHOLOGY MODEL FOR SUBSURFACE FORMATION EVALUATION

(71) Applicants: Hao Zhang, Spring, TX (US); Alberto Mezzatesta, Houston, TX (US)

(72) Inventors: Hao Zhang, Spring, TX (US); Alberto Mezzatesta, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 396 days.

(21) Appl. No.: 15/883,817

(22) Filed: Jan. 30, 2018

(65) Prior Publication Data
US 2019/0235109 A1   Aug. 1, 2019

(51) Int. Cl.
*G06F 11/30* (2006.01)
*G01V 1/30* (2006.01)
(Continued)

(52) U.S. Cl.
CPC .............. *G01V 1/306* (2013.01); *C09K 8/62* (2013.01); *E21B 7/068* (2013.01); *E21B 43/00* (2013.01);
(Continued)

(58) Field of Classification Search
CPC ...................................................... G01V 1/36
See application file for complete search history.

(56) References Cited

U.S. PATENT DOCUMENTS 5,461,562 A    10/1995  Tabanou et al.
5,528,029 A *   6/1996  Chapellat .............. G01V 5/12
                                                    250/265
(Continued)

FOREIGN PATENT DOCUMENTS

WO          0131365 A1     5/2001
WO      20160130945 A1     8/2016

OTHER PUBLICATIONS

Bayer et al; "High Resolution Multi-Facies Realizations of Sedimentary Reservoir and Aquifer Analogs"; Scientific Data; Retrieved Online from https://www.nature.com/article/sdata201533; Jul. 7, 2015; 10 Pages.

(Continued)

*Primary Examiner* — Phuong Huynh
(74) *Attorney, Agent, or Firm* — Cantor Colburn LLP (57) ABSTRACT

Examples of techniques for generating a high-resolution lithology model for subsurface formation evaluation are disclosed. In one example implementation according to aspects of the present disclosure, a computer-implemented method includes determining, by a processing device, a low-resolution lithology volumetric model. The method further includes comparing, by the processing device, the low-resolution lithology volumetric model to a high-resolution imaging log. The method further includes calculating, by the processing device, a dynamic boundary curve for each of a plurality of moving windows. The method further includes generating, by the processing device, the high-resolution lithology model based at least in part on the calculated dynamic boundary curve for each of the plurality of moving windows. The method further includes controlling a drilling operation based at least in part on the high-resolution lithology model.

16 Claims, 8 Drawing Sheets

(51) Int. Cl.

| | |
|---|---|
| *E21B 7/06* | (2006.01) |
| *G01V 1/50* | (2006.01) |
| *C09K 8/62* | (2006.01) |
| *E21B 49/00* | (2006.01) |
| *G01V 99/00* | (2009.01) |
| *G01V 1/28* | (2006.01) |
| *G01V 5/10* | (2006.01) |
| *G01V 3/08* | (2006.01) |
| *E21B 43/00* | (2006.01) |
| *E21B 44/00* | (2006.01) |

(52) U.S. Cl.
CPC ............ *E21B 44/00* (2013.01); *E21B 49/003* (2013.01); *E21B 49/006* (2013.01); *G01V 1/288* (2013.01); *G01V 1/301* (2013.01); *G01V 1/50* (2013.01); *G01V 3/081* (2013.01); *G01V 5/10* (2013.01); *G01V 99/005* (2013.01)

(56) References Cited

U.S. PATENT DOCUMENTS

| | | | |
|---|---|---|---|
| 6,088,656 | A | 7/2000 | Ramakrishnan et al. |
| 6,255,819 | B1 | 7/2001 | Day et al. |
| 6,671,623 | B1 | 12/2003 | Li |
| 6,675,097 | B2 | 1/2004 | Routh et al. |
| 6,816,787 | B2 | 11/2004 | Ramamoorthy et al. |
| 6,944,546 | B2 | 9/2005 | Xiao et al. |
| 6,950,748 | B2 | 9/2005 | Liu et al. |
| 6,963,803 | B2 * | 11/2005 | Heliot ................ G01V 3/38 702/11 |
| 6,984,983 | B2 | 1/2006 | Tabanou |
| 7,133,779 | B2 | 11/2006 | Tilke et al. |
| 7,526,413 | B2 | 4/2009 | Dahlberg |
| 8,174,266 | B2 | 5/2012 | Gold et al. |
| 8,473,213 | B2 | 6/2013 | Zhu et al. |
| 8,725,477 | B2 | 5/2014 | Zhang et al. |
| 9,746,577 | B2 | 8/2017 | Ciucivara et al. |
| 10,392,919 | B2 | 8/2019 | Peyaud et al. |
| 2002/0133323 | A1 * | 9/2002 | Dahlberg ............ G01V 11/00 703/10 |
| 2007/0061079 | A1 | 3/2007 | Hu |
| 2007/0239359 | A1 | 10/2007 | Stelting et al. |
| 2016/0025895 | A1 | 1/2016 | Ziauddin et al. |
| 2017/0032532 | A1 | 2/2017 | Andersen et al. |
| 2017/0275982 | A1 * | 9/2017 | Peyaud ................ G01V 11/00 |

OTHER PUBLICATIONS

Dahlberg et al.; "Comparing Log-Derived and Core Derived Porosity and Mineralogy in Thinly Bedded Reservoirs an Integrated Approach"; SPWLA Twenty-Ninth Annual Logging Symposium; Jun. 5-8, 1988; 18 Pages.

Feng et al; "Reservoir Characterization and Monitoring: From Inversion to Reservoir Characterization"; AAPG/SEG International Conference and Exhibition; Apr. 3-6, 2016; 32 Pages.

Heidari et al; "Inversion-Based Detection of Bed Boundaries for Petrophysical Evaluation With Well Logs: Applications to Carbonate and Organic-Shale Formations"; Technical Paper; Aug. 2014; pp. T129-T142.

International Search Report and Written Opinion Issued in International Application No. PCT/US2019/014739 dated May 14, 2019; 7 Pages.

Peyaud et al.; "Improved Methodology for High-Resolution Bed Mineralogy From Wireline Logs"; SPWLA 51st Annual Logging Symposium; Jun. 19-23, 2010; 8 Pages.

Rodriguez et al.; "Quantitative and Comparative Evaluation of Mineralogy and TOC Analysis from Cores, Cuttings and Logs in Vaca Muerta Unconventional Shale Play"; Unconventional Resources Technology Conference; SPE-178684-MS/URTeC:2172972; 2015; 24 Pages.

Rui et al.; "Improved High Resolution Processing Method and Its Application in Shale Reservoir Characterization"; SEG International Exposition and 87th Annual Meeting; 2017; pp. 3143-3147.

Zhang et al.; Method to Determine High Resolution Lithology for Subsurface Formation Evalutaion; 4 Pages.

Zhang et al; "A Novel Geological Interpretation Methodology for Derivation of Formation Lithology and Mineralogy"; SEG International Exposition and 86th Annual Meeting; 2016; pp. 1656-1660.

* cited by examiner

GENERATING A HIGH-RESOLUTION LITHOLOGY MODEL FOR SUBSURFACE FORMATION EVALUATION

BACKGROUND

The present disclosure relates generally to surface representation for modeling geological surfaces and more particularly to generating a high-resolution lithology model for subsurface formation evaluation.

Mathematical models of geological formations have many uses for hydrocarbon production. Formation models may include both rock fractures and faults and distinct transitions between different deposited rock formations that can contribute to the flow and containment of hydrocarbons and thus provide an estimate of an amount of producible hydrocarbons. Once the amount is estimated, further steps may be taken such as determining the economic feasibility of production from the formation and a suitable location of a well. Other factors may also be determined from the formation model such as stress at each of the fractures and subsidence of formation rock and likelihood of an earthquake after extraction. The accuracy of corresponding estimations and determinations depends on the accuracy of the formation model. Hence, improvement in the accuracy of formation models would be well received in the drilling and production industries.

BRIEF SUMMARY

Embodiments of the invention described herein provide systems, methods, and computer program products for generating a high-resolution lithology model for subsurface formation evaluation. In one embodiment, a computer-implemented method includes determining, by a processing device, a low-resolution lithology volumetric model. The method further includes comparing, by the processing device, the low-resolution lithology volumetric model to a high-resolution imaging log. The method further includes calculating, by the processing device, a dynamic boundary curve for each of a plurality of moving windows. The method further includes generating, by the processing device, the high-resolution lithology model based at least in part on the calculated dynamic boundary curve for each of the plurality of moving windows. The method further includes controlling drilling equipment based at least in part on the high-resolution lithology model.

In another embodiment, a system includes drilling equipment, a memory comprising computer readable instructions, and a processing device for executing the computer readable instructions for performing a method. The method includes determining, by the processing device, a low-resolution lithology volumetric model. The method further includes comparing, by the processing device, the low-resolution lithology volumetric model to a high-resolution imaging log. The method further includes calculating, by the processing device, one or more dynamic boundary curves for each of a plurality of moving windows. The method further includes generating, by the processing device, the high-resolution lithology model based at least in part on the calculated dynamic boundary curve for each of the plurality of moving windows. The method further includes controlling the drilling equipment based at least in part on the high-resolution lithology model.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

A detailed description of one or more embodiments of the disclosed apparatus and method presented herein by way of exemplification and not limitation with reference to the figures. Disclosed is a method implemented by a processor for generating high-resolution lithology for subsurface formation evaluation. The subsurface may represent a fault boundary, a horizon, an unconformity, an intrusion, and/or other features of interest.

Accurate petrophysical modeling and interpretation for thinly bedded formations can utilize high-resolution data that are usually measured in a laboratory from core samples or evaluated from a limited number of high-end logging tools, such as image logs. However, core measurements are expensive and are often available only from a limited number of wells in a field. Moreover, high-resolution logging tools are not able to provide a comprehensive evaluation for all formation properties. Because conventional logging data are available from many wells, an effective analysis combining both low-resolution and high-resolution logging data may be beneficial.

Accordingly, the present techniques provide a stochastic approach to generate high-resolution (HR) lithological descriptions along with other petrophysical properties of the formation. In particular, the present techniques extract lithology volumetric models from HR image logs and other conventional logs. Accordingly, a petrophysical interpretation of an HR lithology description model including various litho types such as sand, shale, carbonate, etc. is provided using the present techniques. More particularly, the present techniques deliver pseudo-linear simulation solutions of formation components (e.g., lithology types, porosity, and fluid saturations) and their relative volumes using various logging responses and model input parameters.

The present techniques provide advantages over conventional log interpretation by revealing the full vertical variability of a formation that would otherwise appear insensitive for thin layers with limited resolution and compromised accuracy. The results generated from this approach demonstrate the feasibility of a digital core analysis method in a cost-effective and timely manner compared to conventional core analysis in the lab.

Figure 1:
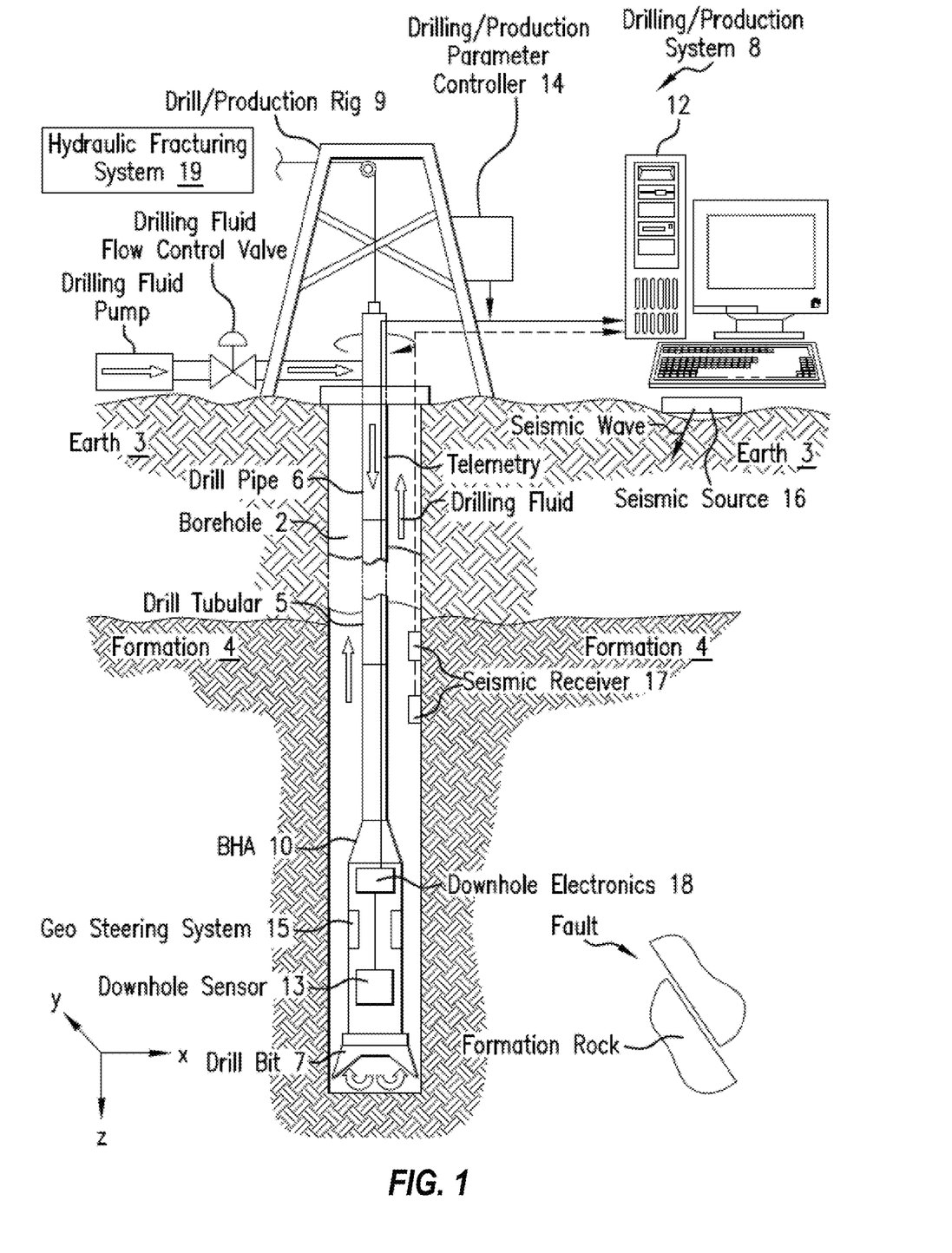
FIG. 1 depicts a cross-sectional view of a borehole penetrating the earth, which includes a formation, according to aspects of the present disclosure.

Apparatus for implementing the disclosure and features related to the disclosure is now discussed. FIG. 1 depicts a cross-sectional view of a borehole 2 penetrating the earth 3, which includes a formation 4, according to aspects of the present disclosure. The formation 4 includes formation rock that has faults or fractures. A seismic source 16 is configured to emit a seismic wave that travels through the formation 4 and is received by seismic receivers 17. Data from the seismic receivers is processed by a processing system 12 to provide a tri-mesh representation of the surfaces of the formation rock to include faults and how the faults are interconnected. The tri-mesh representation geometry includes a boundary.

A drilling/production system 8 includes a drill/production rig 9 that is configured to drill the borehole 2 and/or extract hydrocarbons from the formation 4 via the borehole 2. A drill bit 7 is disposed at the distal end of a drill tubular 5 for drilling the borehole 2. The drill tubular 5 may be a drill string made up of a plurality of connected drill pipes 6. Drilling fluid or mud is pumped through the drill tubular 5 to lubricate the drill bit 7 and flush cuttings from the borehole 2. The drilling fluid is pumped by a drilling fluid pump and a flow rate of the drill fluid is controlled by a drilling fluid control valve. The drilling fluid pump and flow control valve may be controlled by a drilling/production parameter controller 14 to maintain a suitable pressure and flow rate to prevent the borehole 2 from collapsing.

Suitable drilling fluid pressure and flow parameters may be determined by knowing the stresses of the formation rock, which can be determined from representation of the surfaces of the formation rock. The drilling/production parameter controller 14 is configured to control, such as by feedback control for example, parameters used to drill the borehole 2 and/or extract hydrocarbons via the borehole 2. Suitable flow rate for extraction may be determined from knowing the porosity of the formation rock, which can be determined from representation of the surfaces of the formation rock.

The drill tubular 5 includes a bottomhole assembly (BHA) 10. The BHA 10 includes a downhole sensor 13 configured for sensing various downhole properties or parameters related to the formation 4, the borehole 2, and/or position of the BHA 10. Sensor data may be transmitted to the surface by telemetry for processing such as by the processing system 12. The BHA 10 may also include a geo-steering system 15. The geo-steering system 15 is configured to steer the drill bit 7 in order to drill the borehole 2 according to a selected path or geometry. The path or geometry in general is selected to optimize hydrocarbon production from the borehole 2 and to ensure that the stress on the formation due to the borehole along the path does not exceed the strength of the formation material. The optimized geometry may be determined from representation of the surfaces of the formation rock.

Steering commands may be transmitted from the drilling/production parameter controller 14 to the geo-steering system 15 by the telemetry. Telemetry in one or more embodiments may include mud-pulse telemetry or wired drill pipe. Downhole electronics 18 may process data downhole and/or act as an interface with the telemetry. FIG. 1 also depicts a hydraulic fracturing system 19 that is configured to fracture rock of the formation 4 by pumping fracturing fluid at high pressure into the borehole 2.

Figure 2:
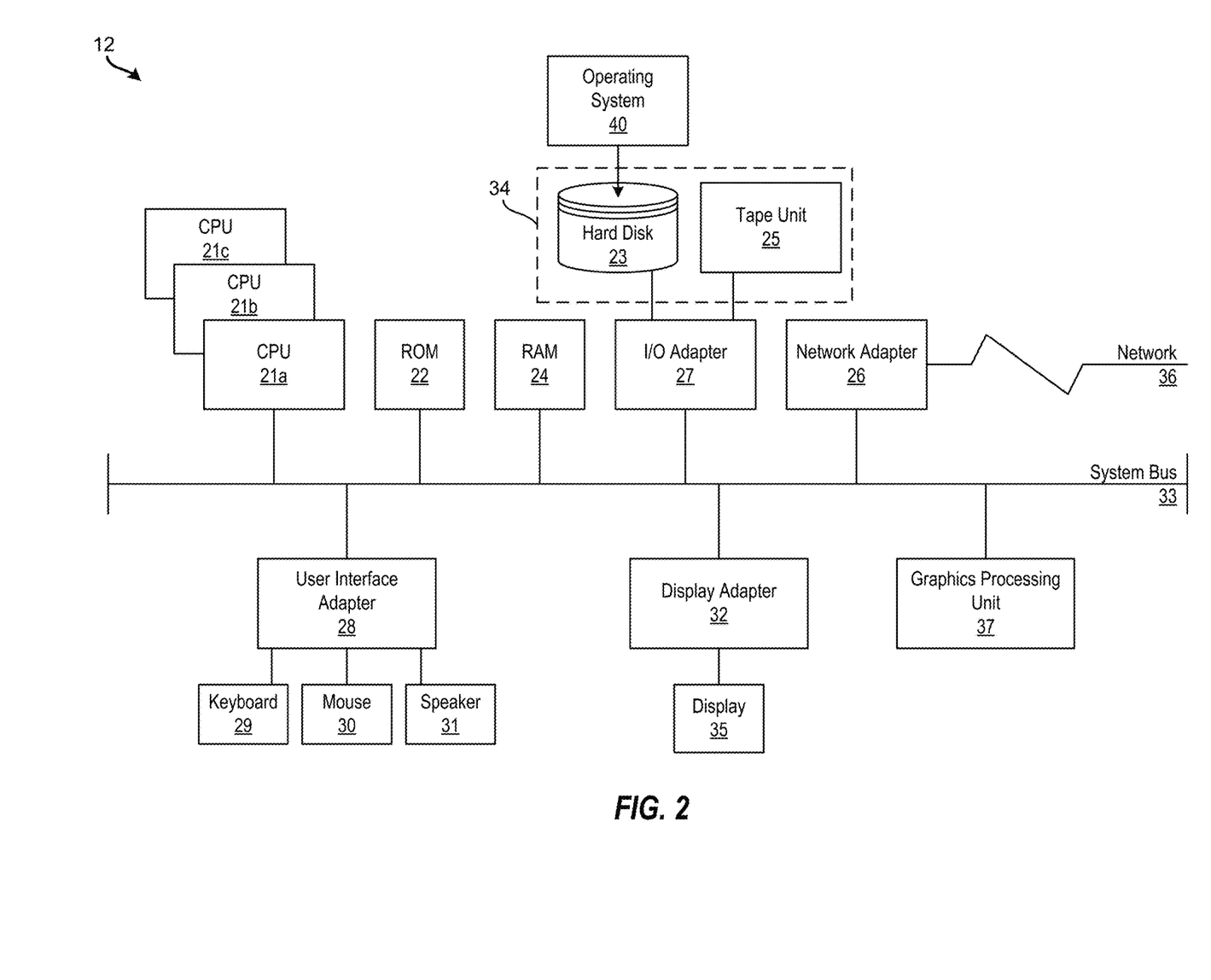
FIG. 2 depicts a block diagram of a processing system for implementing the techniques described herein, according to aspects of the present disclosure.

It is understood that embodiments of the present invention are capable of being implemented in conjunction with any other suitable type of computing environment now known or later developed. For example, FIG. 2 depicts a block diagram of the processing system 12 of FIG. 1, which can be used for implementing the techniques described herein. In examples, processing system 12 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 12.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 12 may be stored in mass storage 34. A network adapter 26 interconnects system bus 33 with an outside network 36 enabling processing system 12 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 12 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 12 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 12.

Figure 3:
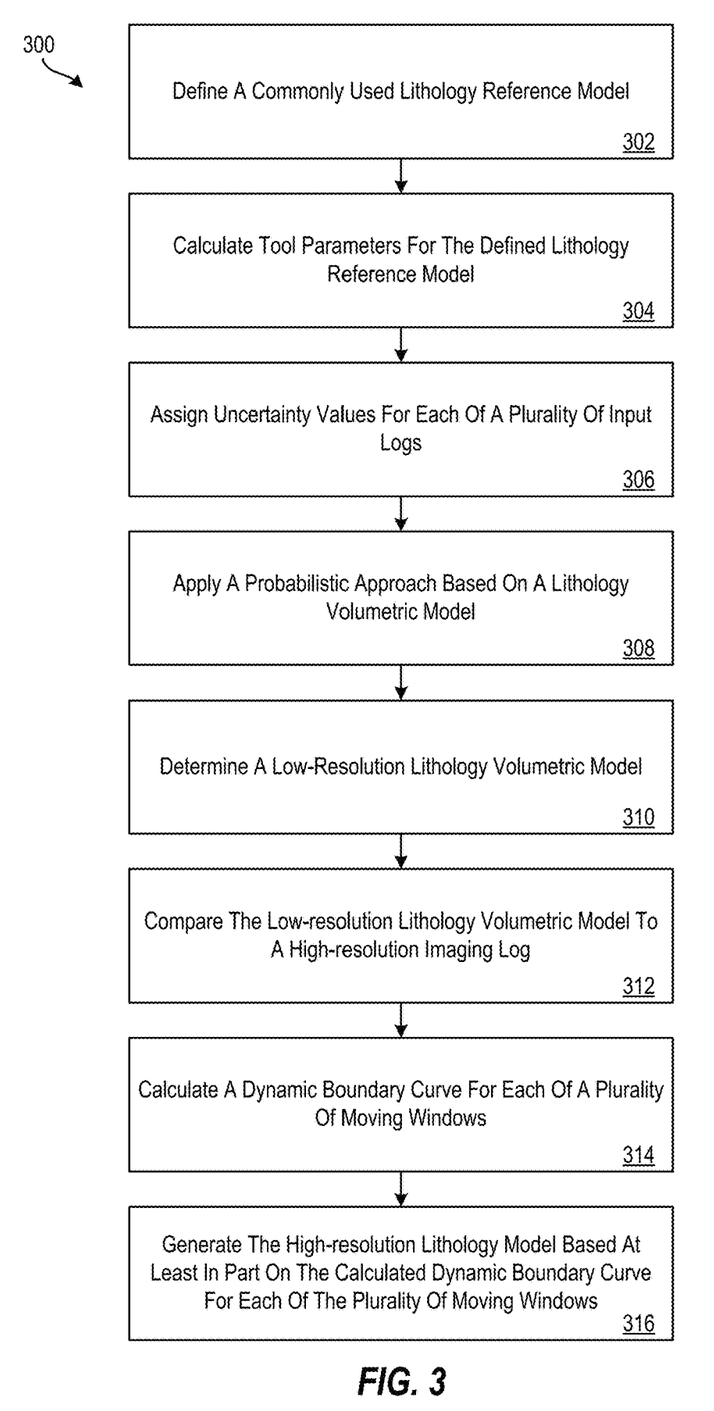
FIG. 3 depicts a flow diagram of a method for generating a high-resolution lithology model, according to aspects of the present disclosure.

FIG. 3 depicts a flow diagram of a method for generating a high-resolution lithology, according to aspects of the present disclosure. The method 300 can be implemented using a processing system, such as the processing system 12 of FIGS. 1 and 2, or another suitable processing system or processing device.

Proper selection of parameters and input curves are important to petrophysical interpretation and can result in a close approximation to results from single and multi-component models. It is especially useful for solving lithology models due to the compositions for each lithology can change radically from one formation to another. To avoid guessing the tool parameters for various lithology types, forward models are used to calculate the tool responses for user-defined reference lithology models.

Accordingly, at block 302 of FIG. 3, the processing system (e.g., the processing system 12) defines a commonly used lithology reference model For example, a commonly used lithology reference model(s) can be defined using known mineral composition, porosity, and fluid saturations based on local knowledge and previous logging/core data.

Based on the lithology reference model(s) defined at block 302, tool parameters are calculated at block 304 using a tool response forward model(s). The tool parameters can include a density response, a compensated neutron response, an acoustic response, a nuclear magnetic resonance response, a spectroscopy elemental weight fraction response, and/or a tool response(s) from logging equipment. The tool parameters are generated using, for example, a lookup table, which defines the properties for common minerals.

A serial of data preparation processes, such as depth matching, environmental corrections, data merging, vertical resolution matching, and data preparation, are implemented before assigning uncertainty values for input longs at block 306. In particular, at block 306, uncertainty values are assigned for input logs via fixed parameter input, internal calculation, or external input curves from using uncertainty calculation programs.

At block 308 of FIG. 3, a probabilistic approach is applied based on a lithology volumetric model. In particular, the processing system passes lithology parameters and input curves, including user-selected logs and their assigned uncertainties to a probabilistic program for integrated interpretation. The outputs from the probabilistic solver are low resolution (LR) lithology volumetric models at block 310 (depicted in FIG. 4A), which can be converted to HR lithology models using the following steps.

In particular, at block 312 of FIG. 3, the processing system compares the LR lithology volumetric model (e.g., the LR lithology volumetric model 400 of FIG. 4A) to a HR imaging log and then, at block 314, calculates a set of dynamic cutoff values (or dynamic boundary curves) for each of a plurality of moving windows. In particular, the dynamic cutoff values are applied to HR resistivity (or acoustic) logs generated from image logs at each image level as depicted in FIG. 4B for each of the moving windows as depicted in FIG. 4C. In some examples, there more than one boundary curve can be calculated for each moving window, and the number of boundary curves can dependent on a desired number of lithology types.

Figure 4D:
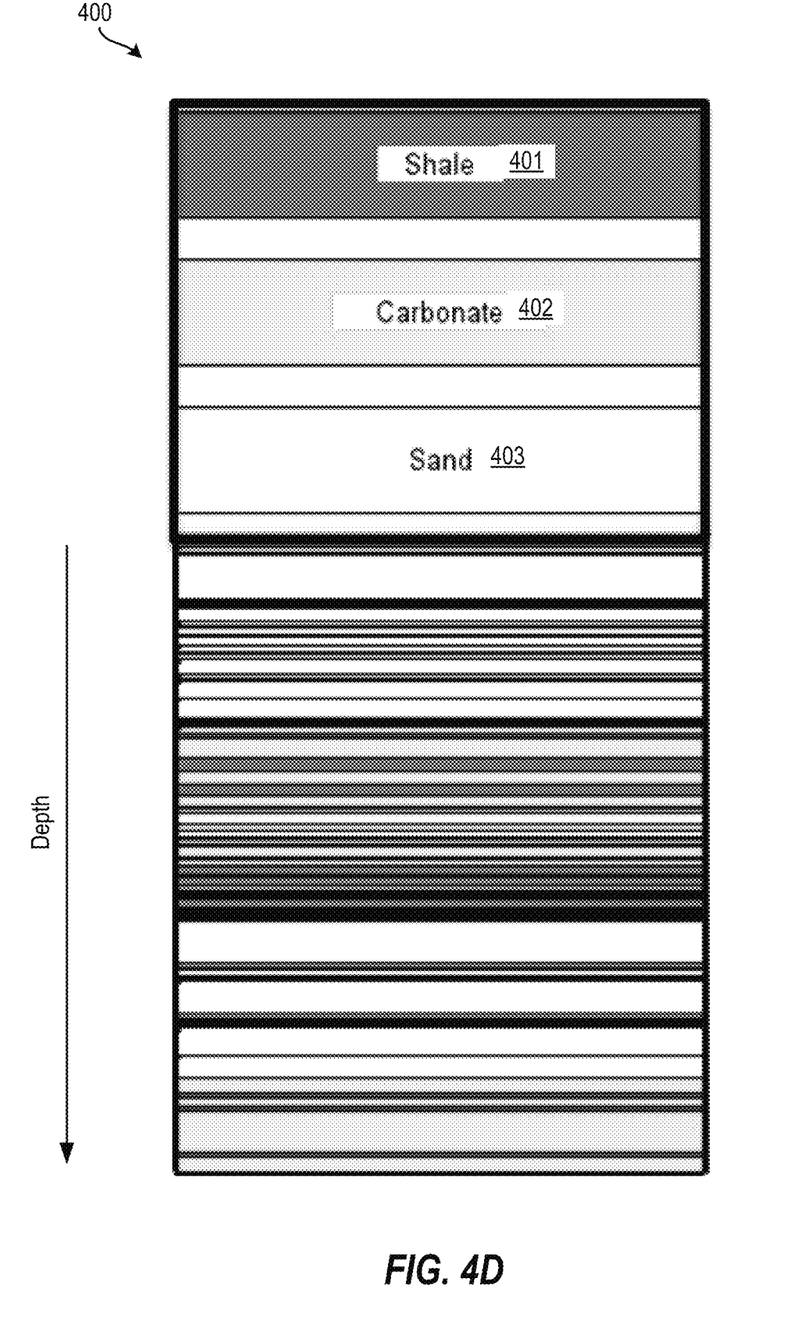
FIG. 4D depicts an HR lithology model, according to aspects of the present disclosure.
Figure 5:
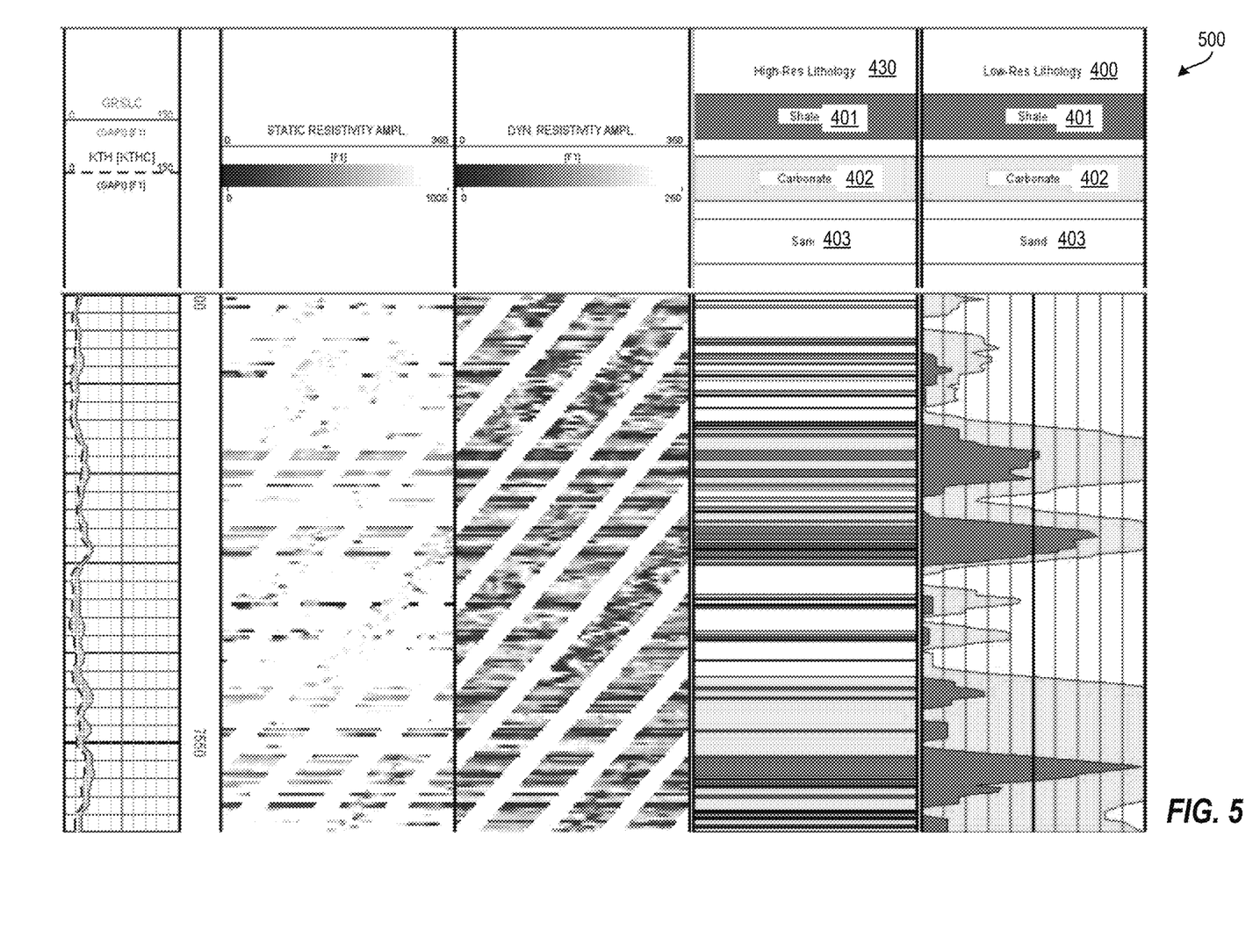
FIG. 5 depicts an example of an HR lithology model, according to aspects of the present disclosure.

At block 316 of FIG. 3, the processing system creates the HR lithology model (i.e., lithology volume fractions or layers) by partitioning the HR resistivity measurements based on dynamic cutoffs. The results can be compared to core measurements as a quality control check or verification. An example HR lithology model is depicted in FIG. 4D and FIG. 5.

The HR lithology model can be used to control a drilling operation and/or drilling equipment, such as setting or changing drilling parameters (e.g., rate of penetration, weight on bit, depth, trajectory of a drill bit etc.). Controlling the drilling equipment in this way represents an improvement in drilling technology and subsurface exploration by providing finer grain control of the drilling equipment by applying the HR lithology model to the drilling. For example, using the HR lithology model reveals the full vertical variability of a formation that would otherwise appear insensitive for thin layers with limited resolution and compromised accuracy of traditional log interpretation techniques used in drilling operations. According to some examples, the method 300 further includes preforming reservoir assessment and designing completion and production strategies based at least in part on the high-resolution lithology model.

Additional processes also may be included, and it should be understood that the processes depicted in FIG. 3 represent illustrations, and that other processes may be added or existing processes may be removed, modified, or rearranged without departing from the scope and spirit of the present disclosure.

FIGS. 4A-4D illustrate the process of generating an HR lithology model described in blocks 310, 312, 314, 316 of FIG. 3 above according to aspects of the present disclosure. Dynamic cutoff values (e.g., boundary curves) applied to the HR resistivity log at each depth level can be calculated by comparing the LR lithology model (from the probabilistic calculation) to the HR image logs. Then, for each level of the HR image, various lithology volume fractions/layers are computed.

Figure 4A:
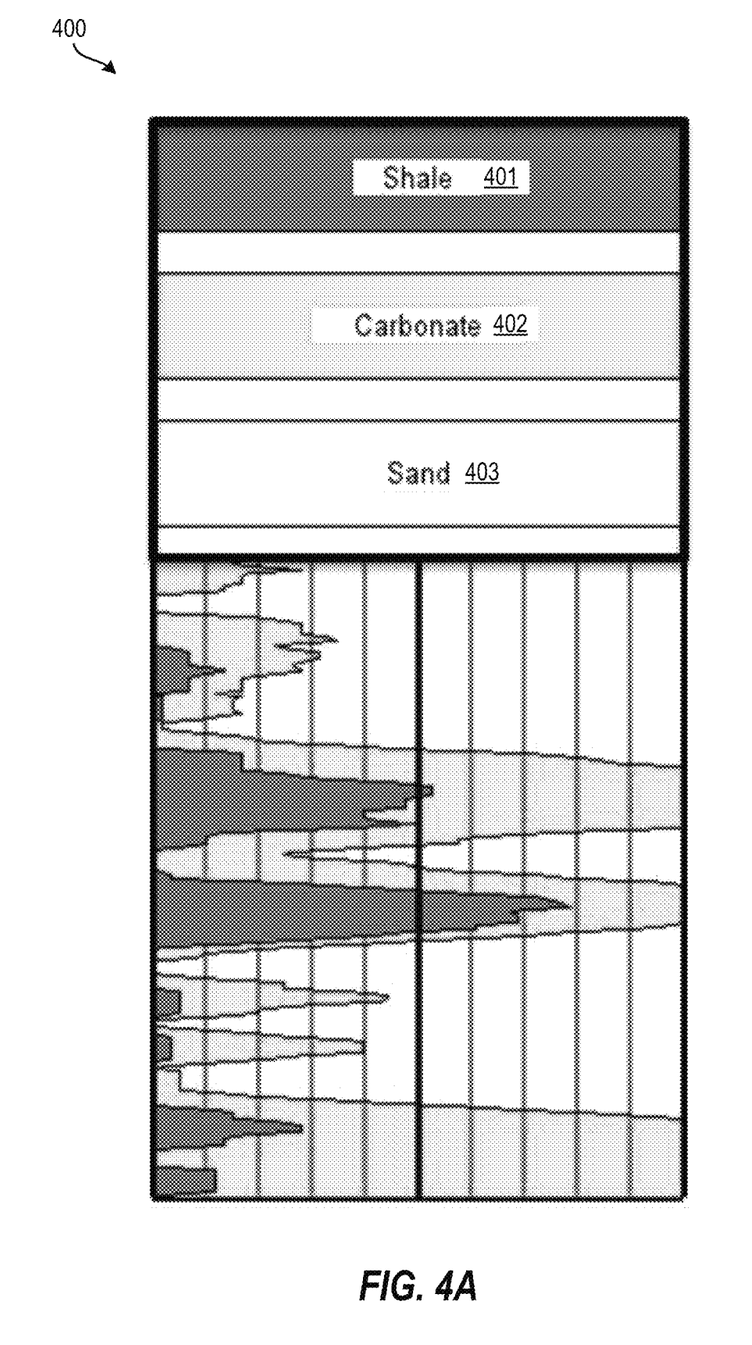
FIG. 4A depicts an LR lithology model, according to aspects of the present disclosure.
Figure 4B:
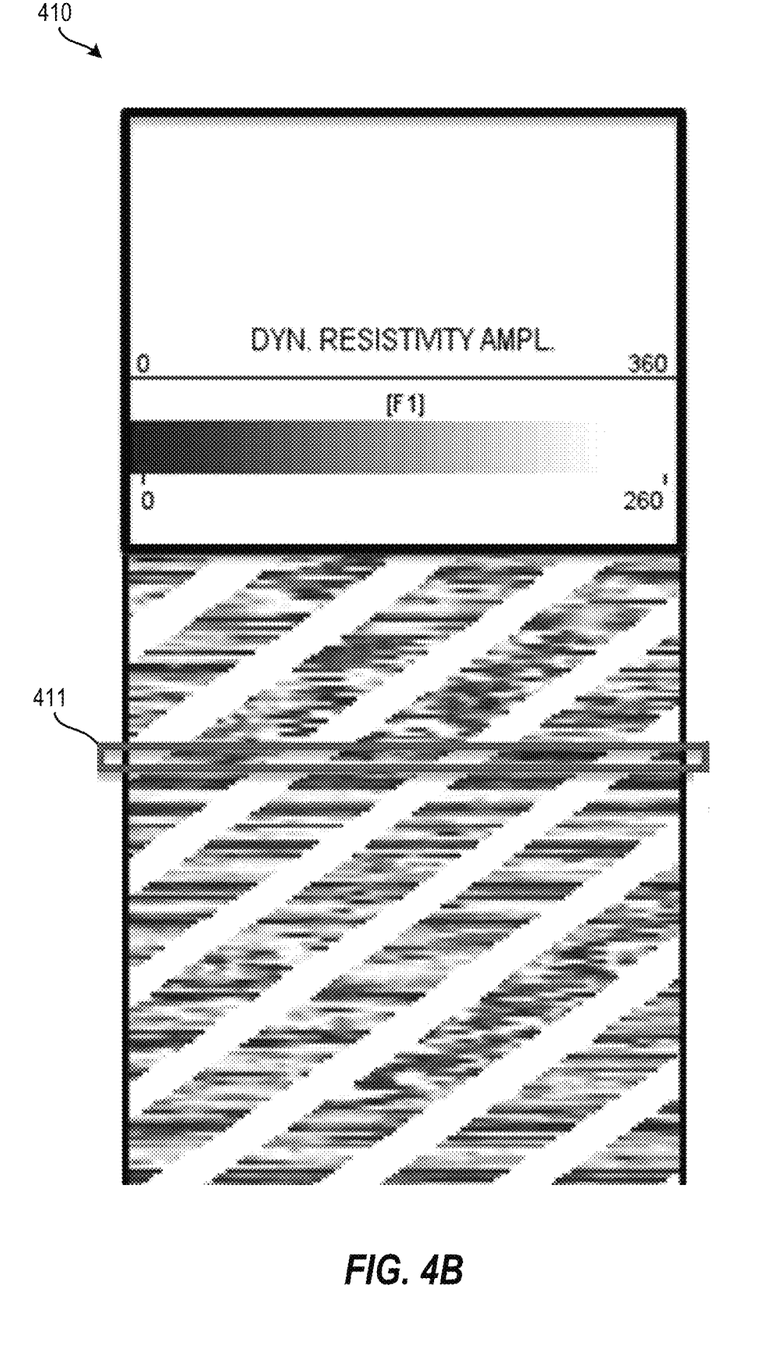
FIG. 4B depicts an HR imaging log, according to aspects of the present disclosure.
Figure 4C:
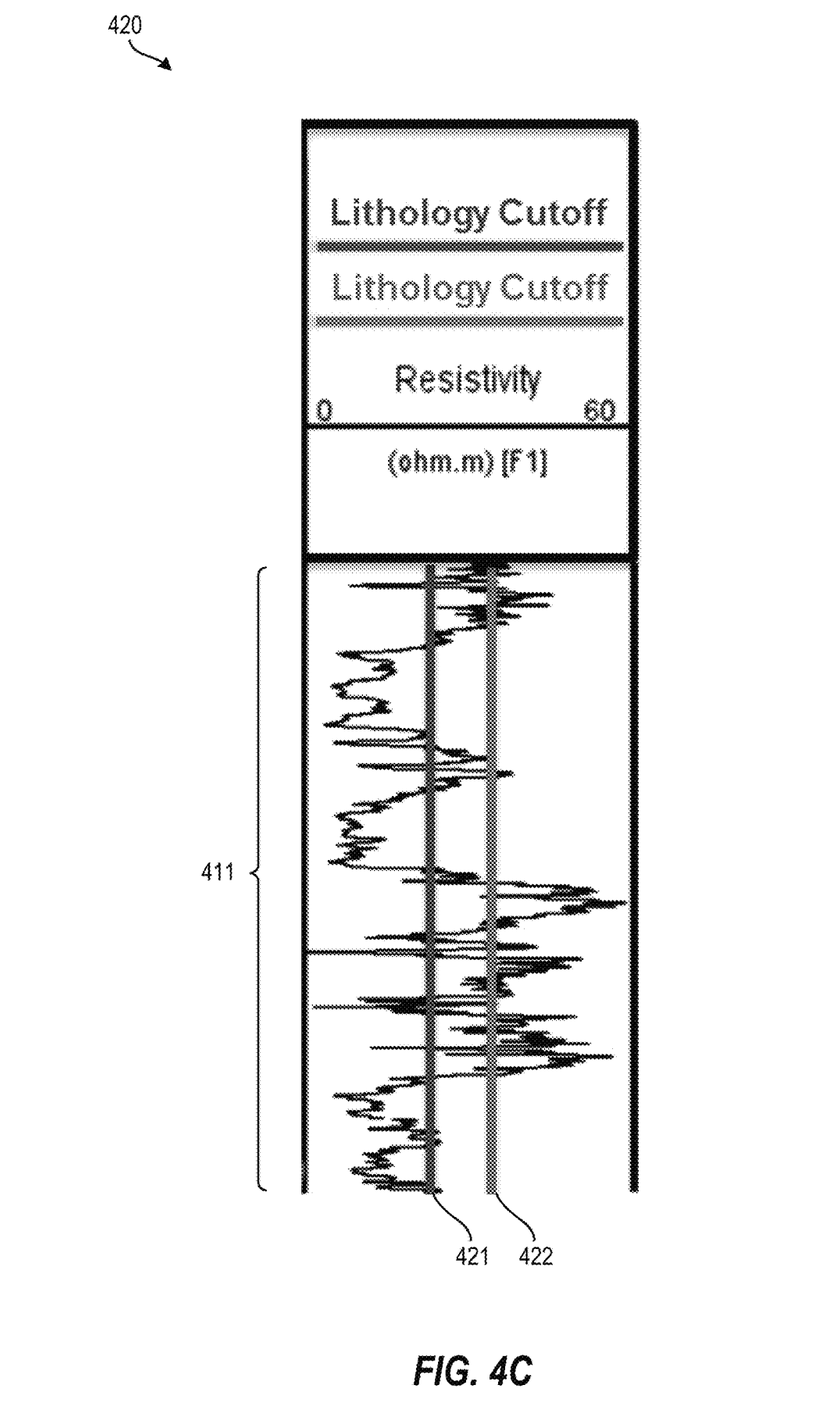
FIG. 4C depicts a moving window, according to aspects of the present disclosure.

In particular, FIG. 4A depicts an LR lithology model 400, according to aspects of the present disclosure. The LR lithology model 400 includes three regions of different subsurface material types: a shale region 401, a carbonate region 402, and a sand region 403. The boundary between the shale region 401 and the carbonate region 402 and the boundary between the carbonate region 402 and the sand region represent transitions between the material types. It should be appreciated that various material types are contemplated, such as sand, carbonate, shale, evaporate, igneous, coal, or other lithology types. FIG. 4B depicts an HR imaging log 410 of resistivity measurements, according to aspects of the present disclosure. The HR imaging log 410 includes a region of interest 411 across a plurality of paths. The region of interest is merely for illustrative purposes, and it should be appreciated that one or more portions, or all, of the HR imaging log 410 may be of interest.

FIG. 4C depicts a moving window 420, according to aspects of the present disclosure. The moving window is a combination of the data of the LR lithology model 400 and the HR imaging log 410 of FIGS. 4A and 4B respectively for the region of interest 411. The moving window 420 depicts average resistivity extracted from the paths of the HR imaging log 410. The moving window 420 applies boundary curves 421, 422, which are averages of the cutoff values. Once the boundary curves 421, 422 are applied, the HR lithology model 430 is generated, which is depicted in FIG. 4D, according to aspects of the present disclosure. For the various depths, the HR lithology model 430 indicates the subsurface material type (e.g., shale 401, carbonate 402, and sand 403) expected at that depth.

FIG. 5 depicts an example of an HR lithology model 500, according to aspects of the present disclosure. In this example, the HR lithology 430 is shown alongside the LR lithology 400. As can be appreciated, the HR lithology 430 reveals the full vertical variability of a formation that would otherwise appear insensitive for thin layers with limited resolution and compromised accuracy of traditional log interpretation techniques used in drilling operations.

Embodiment 1

A method for generating a high-resolution lithology model is provided, the method including: determining, by a processing device, a low-resolution lithology volumetric model; comparing, by the processing device, the low-resolution lithology volumetric model to a high-resolution imaging log; calculating, by the processing device, a dynamic boundary curve for each of a plurality of moving windows; generating, by the processing device, the high-resolution lithology model based at least in part on the calculated dynamic boundary curve for each of the plurality of moving windows; and controlling drilling equipment based at least in part on the high-resolution lithology model.

Embodiment 2

The computer-implemented of any prior embodiment further comprising, prior to determining the low-resolution lithology volumetric model: defining, by the processing device, a commonly used lithology reference model.

Embodiment 3

The computer-implemented of any prior embodiment wherein defining the commonly used lithology reference model is based at least in part on one or more of a known mineral composition, a known porosity, and a known fluid saturation.

Embodiment 4

The computer-implemented of any prior embodiment further comprising: calculating, by the processing device, tool parameters for the defined commonly used lithology reference model.

Embodiment 5

The computer-implemented of any prior embodiment wherein the tool parameters are one or more of a density response, a compensated neutron response, an acoustic response, a nuclear magnetic resonance response, a spectroscopy elemental weight fraction response, and a tool response from logging equipment.

Embodiment 6

The computer-implemented of any prior embodiment further comprising: assigning, by the processing device, uncertainty values for each of a plurality of input logs.

Embodiment 7

The computer-implemented of any prior embodiment further comprising: applying, by the processing device, a probabilistic approach based on the defined commonly used lithology reference model.

Embodiment 8

The computer-implemented of any prior embodiment wherein the high-resolution lithology model indicates a subsurface material type at each depth level of an earth formation.

Embodiment 9

The computer-implemented of any prior embodiment wherein the subsurface material type is one of sand, carbonate, and shale.

Embodiment 10

The computer-implemented of any prior embodiment wherein controlling the drilling equipment comprises adjusting at least one of a rate of penetration, a weight on bit, a depth of a drill bit, and a trajectory of the drill bit.

Embodiment 11

A system is provided, system including drilling equipment; a memory comprising computer readable instructions; and a processing device for executing the computer readable instructions for performing a method for generating a high-resolution lithology model, the method comprising: determining, by the processing device, a low-resolution lithology volumetric model; comparing, by the processing device, the low-resolution lithology volumetric model to a high-resolution imaging log; calculating, by the processing device, one or more dynamic boundary curves for each of a plurality of moving windows; generating, by the processing device, the high-resolution lithology model based at least in part on the calculated dynamic boundary curve for each of the plurality of moving windows; and controlling the drilling equipment based at least in part on the high-resolution lithology model.

Embodiment 12

The system of any prior embodiment wherein the method further comprises, prior to determining the low-resolution lithology volumetric model: defining, by the processing device, a commonly used lithology reference model; calculating, by the processing device, tool parameters for the defined commonly used lithology reference model; assigning, by the processing device, uncertainty values for each of a plurality of input logs; and applying, by the processing device, a probabilistic approach based on the defined commonly used lithology reference model.

Embodiment 13

The system of any prior embodiment wherein the high-resolution lithology model indicates a subsurface material type at each depth level of an earth formation.

Embodiment 14

The system of any prior embodiment wherein the subsurface material type is one of sand, carbonate, shale, evaporate, igneous, and coal.

Embodiment 15

The system of any prior embodiment wherein controlling the drilling equipment comprises adjusting at least one of a rate of penetration, a weight on bit, a depth of a drill bit, and a trajectory of the drill bit.

Embodiment 16

The system of any prior embodiment wherein the method further comprises preforming reservoir assessment and designing completion and production strategies based at least in part on the high-resolution lithology model.

In support of the teachings herein, various analysis components may be used, including a digital and/or an analog system. For example, the computer processing system 12, the downhole sensor 13, the drilling/production parameter controller 14, the geo-steering system 15, the seismic source 16, the seismic receiver 17, the downhole electronics 18, and/or the telemetry may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method for generating a high-resolution lithology model, the method comprising:
    determining, by a processing device, a low-resolution lithology volumetric model;
    comparing, by the processing device, the low-resolution lithology volumetric model to a high-resolution imaging log;
    calculating, by the processing device, a dynamic boundary curve for each of a plurality of moving windows;
    generating, by the processing device, the high-resolution lithology model based at least in part on the calculated dynamic boundary curve for each of the plurality of moving windows; and
    controlling drilling equipment based at least in part on the high-resolution lithology model.

2. The computer-implemented method of claim 1, further comprising, prior to determining the low-resolution lithology volumetric model:
    defining, by the processing device, a commonly used lithology reference model.

3. The computer-implemented method of claim 2, wherein defining the commonly used lithology reference model is based at least in part on one or more of a known mineral composition, a known porosity, and a known fluid saturation.

4. The computer-implemented method of claim 2, further comprising:
    calculating, by the processing device, tool parameters for the defined commonly used lithology reference model.

5. The computer-implemented method of claim 4, wherein the tool parameters are one or more of a density response, a compensated neutron response, an acoustic response, a nuclear magnetic resonance response, a spectroscopy elemental weight fraction response, and a tool response from logging equipment.

6. The computer-implemented method of claim 4, further comprising:
    assigning, by the processing device, uncertainty values for each of a plurality of input logs.

7. The computer-implemented method of claim 6, further comprising:
    applying, by the processing device, a probabilistic approach based on the defined commonly used lithology reference model.

8. The computer-implemented method of claim 1, wherein the high-resolution lithology model indicates a subsurface material type at each depth level of an earth formation.

9. The computer-implemented method of claim 8, wherein the subsurface material type is one of sand, carbonate, and shale.

10. The computer-implemented method of claim 1, wherein controlling the drilling equipment comprises adjusting at least one of a rate of penetration, a weight on bit, a depth of a drill bit, and a trajectory of the drill bit.

11. A system comprising:
drilling equipment;
a memory comprising computer readable instructions; and
a processing device for executing the computer readable instructions for performing a method for generating a high-resolution lithology model, the method comprising:
determining, by the processing device, a low-resolution lithology volumetric model;
comparing, by the processing device, the low-resolution lithology volumetric model to a high-resolution imaging log;
calculating, by the processing device, one or more dynamic boundary curves for each of a plurality of moving windows;
generating, by the processing device, the high-resolution lithology model based at least in part on the calculated dynamic boundary curve for each of the plurality of moving windows; and
controlling the drilling equipment based at least in part on the high-resolution lithology model.

12. The system of claim 11, wherein the method further comprises, prior to determining the low-resolution lithology volumetric model:
defining, by the processing device, a commonly used lithology reference model;
calculating, by the processing device, tool parameters for the defined commonly used lithology reference model;
assigning, by the processing device, uncertainty values for each of a plurality of input logs; and
applying, by the processing device, a probabilistic approach based on the defined commonly used lithology reference model.

13. The system of claim 11, wherein the high-resolution lithology model indicates a subsurface material type at each depth level of an earth formation.

14. The system of claim 13, wherein the subsurface material type is one of sand, carbonate, shale, evaporate, igneous, and coal.

15. The system of claim 11, wherein controlling the drilling equipment comprises adjusting at least one of a rate of penetration, a weight on bit, a depth of a drill bit, and a trajectory of the drill bit.

16. The system of claim 11, wherein the method further comprises preforming reservoir assessment and designing completion and production strategies based at least in part on the high-resolution lithology model.

* * * * *